(12) United States Patent
Roth et al.

(10) Patent No.: US 11,767,861 B2
(45) Date of Patent: Sep. 26, 2023

(54) SENSOR UNIT FOR FLUIDIC CYLINDER AND FLUIDIC CYLINDER

(71) Applicant: SIKO GmbH, Buchenbach (DE)

(72) Inventors: Mathias Roth, Buchenbach (DE); Hanspeter Thoma, March-Neuershausen (DE)

(73) Assignee: SIKO GMBH, Buchenbach (DE)

( * ) Notice: Subject to any disclaimer, the term of this patent is extended or adjusted under 35 U.S.C. 154(b) by 398 days.

(21) Appl. No.: 16/985,361

(22) Filed: Aug. 5, 2020

(65) Prior Publication Data

US 2021/0040965 A1 Feb. 11, 2021

(30) Foreign Application Priority Data

Aug. 9, 2019 (EP) .................................... 19190938

(51) Int. Cl.
| | |
|---|---|
| *F15B 15/28* | (2006.01) |
| *G01B 7/14* | (2006.01) |
| *G01G 5/04* | (2006.01) |
| *G01B 17/00* | (2006.01) |
| *G01L 9/00* | (2006.01) |

(52) U.S. Cl.
CPC ...... *F15B 15/2815* (2013.01); *F15B 15/2861* (2013.01); *F15B 15/2884* (2013.01); *G01B 7/14* (2013.01); *G01B 17/00* (2013.01); *G01G 5/04* (2013.01); *G01L 9/0051* (2013.01); *G01L 9/0072* (2013.01)

(58) Field of Classification Search
CPC .............. F15B 15/2815; F15B 15/2861; F15B 15/2884; G01B 7/14; G01B 5/04
See application file for complete search history.

(56) References Cited

U.S. PATENT DOCUMENTS

| | | | |
|---|---|---|---|
| 1,870,188 A * | 8/1932 | Abrams | ................... G01F 3/16 73/239 |
| 3,973,472 A * | 8/1976 | Russell, Jr. | ............ B60K 31/06 91/170 R |
| 4,700,610 A * | 10/1987 | Bauer | ....................... F15B 9/03 91/1 |
| 2005/0081710 A1* | 4/2005 | Albright | ............. F15B 15/2815 92/5 R |
| 2019/0257327 A1* | 8/2019 | Chen | ...................... E02F 9/267 |

FOREIGN PATENT DOCUMENTS

| | | |
|---|---|---|
| DE | 19903183 | 8/2000 |
| DE | 10052053 | 4/2002 |
| DE | 102014005637 | 10/2015 |
| DE | 102018122122 | 3/2019 |
| WO | 8500204 | 1/1985 |
| WO | 2006056214 | 6/2006 |
| WO | 2016142194 | 9/2016 |

OTHER PUBLICATIONS

European Office Action dated Apr. 7, 2022 from corresponding European Application No. 19 190 938.1.
European Search Report dated Feb. 25, 2020 for corresponding European Application No. 19 190 938.1.

\* cited by examiner

*Primary Examiner* — Paul M. West
(74) *Attorney, Agent, or Firm* — Grogan, Tuccillo & Vanderleeden, LLP

(57) ABSTRACT

A sensor unit for a fluidic cylinder having a base carrier on which a circumferential seal is formed, so that an interior of the fluidic cylinder is sealable, and having a position sensor for detecting a position of the piston, and having a pressure sensor for detecting a pressure in the interior.

11 Claims, 3 Drawing Sheets

SENSOR UNIT FOR FLUIDIC CYLINDER AND FLUIDIC CYLINDER

CROSS-REFERENCE TO RELATED APPLICATIONS

This application claims priority to European Patent Application Serial No. 19190938.1-1001, filed on Aug. 9, 2019, which is hereby incorporated by reference herein in its entirety.

FIELD OF THE INVENTION

The invention relates to a sensor unit for a fluidic cylinder having a base carrier, on which a circumferential seal is formed, so that an interior of the fluidic cylinder is sealable, and having a position sensor for detecting a position of the piston.

BACKGROUND OF THE INVENTION

Such sensor units are known and are used, for example, in hydraulic and pneumatic cylinders to detect the current position of the piston. In this case, the base carrier delimits the fluid-guiding interior in relation to an unpressurized region of the fluidic cylinder by way of the circumferential seal.

The invention thus relates to enlarging the field of use of such sensor units.

SUMMARY OF THE INVENTION

This object is achieved by a sensor unit as claimed in claim 1, a fluidic cylinder as claimed in claim 12, and a method as claimed in claim 9.

The sensor unit according to the invention is accordingly characterized in that the sensor unit has a pressure sensor for detecting a pressure in the interior.

The advantage is that the output signals of the pressure sensor and the position sensor can be offset to form a variable about an operating state of the working cylinder.

This can be provided, for example, in that a load of the piston rod is detected via the pressure and a position of the piston is detected via the position sensor.

Manifold options result here. For example, in the case of a mobile crane, the weight can be detected in the boom or in the case of a working machine, the ground support can be detected. Error detection can also be performed, which differs, for example, as to whether the piston moves without the pressure changing.

In particular, it can be advantageous if the position sensor and the pressure sensor are arranged in the interior. In this way, the sensors are protected from external influences, in particular from mechanical damage.

The pressure sensor can be implemented in manifold ways. For example, commercially-available pressure sensors can be installed.

However, it is particularly expedient if a pressure-variable region is formed on a surface of the base carrier in the interior, and a pickup for detecting a pressure-dependent shape change of the pressure-variable region is arranged, preferably outside the interior. In this manner, the pickup is not arranged in the fluid, so that the pickup does not have to be fluid-proof and accordingly can be significantly simpler and less expensive.

In one embodiment, the pressure-variable region is formed as a membrane. This membrane is deflected or deformed by pressure application by the fluid. The membrane can be incorporated into the base carrier, for example. However, the membrane can also be formed by thinning a wall region of the base carrier. The advantage in this case is that the membrane is integrally formed with the base carrier and thus sealing measures are not necessary to seal off the membrane. The membrane can be formed, for example, by milling from the rear side.

The base carrier or the sensor unit is general is formed in such a way that it is insertable into the interior of a fluidic cylinder and by way of the circumferential seal, it divides it into an interior in which the fluid is located, and an unpressurized and fluid-free space. The piston is accordingly arranged in the interior and movable therein by the fluid.

It is advantageous here if the base carrier has means for fastening in a fluidic cylinder, for example, a circumferential groove, in which a grub screw can engage. Secure fixing of the base carrier can thus be achieved. In particular, an axial stop can also be provided in a fluidic cylinder, against which the base carrier abuts axially. It is thus ensured that the base carrier is not axially displaced upon axial pressure application.

Alternatively or additionally, the base carrier can have an external thread, so that the base carrier can be screwed into an internal thread inside the fluidic cylinder.

In a further alternative embodiment, the base carrier can have a flange connection for the connection to a fluidic cylinder.

The position sensor can have various designs, which are unimportant for the invention, however. The invention is therefore not restricted to a special embodiment of the position sensor.

It can nonetheless be advantageous if the position sensor is designed for detecting a relative movement between two components, in particular between piston and base carrier. In this manner, direct detection of the piston movement is possible, and thus also accurate and rapid measurement. The detection can be performed in particular by ultrasound, magnetostriction, or induction.

In one embodiment, the base carrier has an evaluation unit outside the interior, in which the sensor values are detected. The evaluation unit can be electrically connected for this purpose to the position sensor and the pressure sensor, in particular to the pickup.

The invention also comprises a method for determining an operating state of a fluidic cylinder. This method is characterized in that a position of a piston is detected by means of a position sensor, in that a pressure in an interior of the fluidic cylinder is detected by means of a pressure sensor, and in that the operating state is determined from the detected position and the detected pressure.

In this way, for example, a load of the piston rod can be detected via the pressure and can be related to the position of the piston.

Manifold options for determining an operating state result here.

In one advantageous embodiment, the operating state can be used to determine a weight load and/or a ground support. Thus, for example, in the case of a mobile crane, the weight can be detected in the boom or in the case of a working machine, the ground support can be detected. In this manner, it can be recognized in particular whether the ground is sufficiently compacted to support the weight of the working machine and a payload.

In one embodiment, an error state can be recognized from the operating state, in that a position change is related to a pressure change.

It can thus be recognized, for example, whether the piston moves without the pressure changing.

If a pressure change takes place without the piston moving, a stuck piston can thus be recognized, for example. Overall, still further operating states thus result, which can be detected via the combination of the sensor values. The invention is therefore not restricted to a specific operating state.

The invention also comprises a fluidic cylinder having a piston movable by fluid and having a position sensor for detecting a position of the piston, which is characterized in that the fluidic cylinder has a pressure sensor for detecting a pressure within the fluid. The above-described advantages are achievable in this way. The piston is arranged here in an interior of the fluidic cylinder.

In particular, a fluidic cylinder according to the invention has a sensor unit according to the invention and is designed in particular to carry out a method according to the invention.

The invention is explained in greater detail hereinafter on the basis of preferred exemplary embodiments with reference to the appended drawings.

DETAILED DESCRIPTION OF THE DRAWINGS

Figure 1:
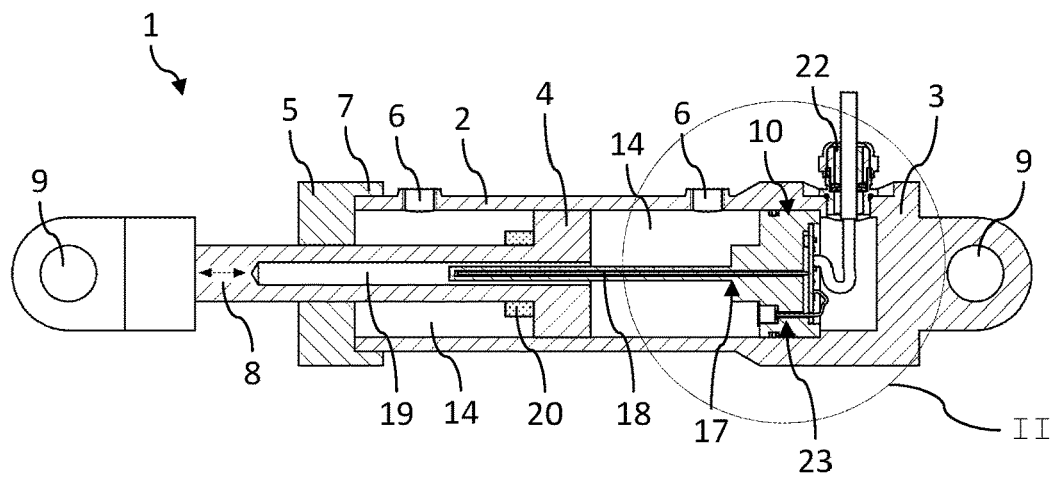
FIG. 1: shows a sectional illustration of a fluidic cylinder having a magnetostrictive position sensor.

FIG. 1 shows a fluidic cylinder 1 having a cylinder tube 2, a cylinder base 3, a piston 4, and a cylinder head 5. Such fluidic cylinders 1 are known, for example, as hydraulic cylinders or pneumatic cylinders The piston 4 is arranged movably in the axial direction inside the cylinder tube 2 here.

Two fluid fittings 6 are arranged in the cylinder tube 2 in such a way that they permit a maximum movement of the piston 4, i.e., at the greatest possible axial distance. The cylinder tube 2 can have an arbitrarily shaped, preferably a circular cross section.

The cylinder tube 2 and the cylinder base 3 are integrally formed in the example. However, it is also possible that the cylinder tube 2 and the cylinder base 3 are two separate parts. The two parts could then be connected to one another, for example, by a thread or a flange connection.

The cylinder head 5 is designed in the example so that it can be placed on the cylinder tube 2 and a circumferential collar 7 radially overlaps the cylinder tube 2. A piston rod 8, which protrudes through the cylinder head 5, is connected to the piston 4.

Eyes 9 for installing the fluidic cylinder 1 are arranged in each case on the free end of the piston rod 8 and on the cylinder base 3.

Figure 2:
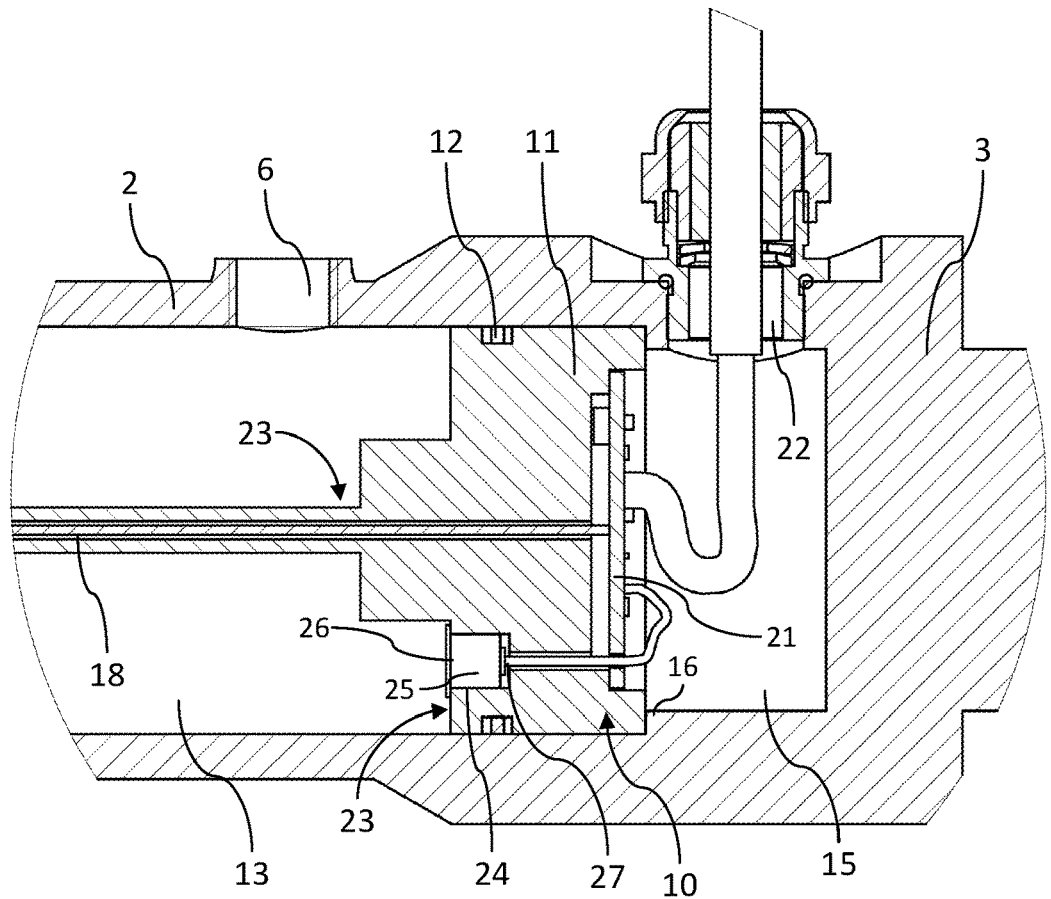
FIG. 2: shows a detail view of the sensor unit of FIG. 1, FIG. 3: shows a sectional illustration of a fluidic cylinder having a cable pull position sensor.

A sensor unit 10 is arranged in the interior of the cylinder tube 2 between the cylinder base 3 and the fluid fitting 6 closest thereto, as shown in greater detail in FIG. 2. This sensor unit 10 has a base carrier 11, which has a circumference formed tailored to the internal circumference of the cylinder tube 2.

A circumferential seal 12, which delimits the interior 13 in the cylinder tube 2 in which the piston 4 and the fluid 14 are arranged, is arranged on the circumference of the base carrier 11. The seal 12 is formed in the example as an O-ring, which is inserted into a circumferential groove in the base carrier 11. However, the seal can also be formed in another manner.

An unpressurized and in particular fluid-free space 15 is formed on the other side of the seal 12. The base carrier 11 axially abuts a circumferential edge 16 in the unpressurized space 15, so that it cannot be axially displaced by the piston 4 due to an axial pressure application. An evaluation unit 21 is arranged on the base carrier 11 in the unpressurized space 15.

The sensor unit 10 has a position sensor 17 in the interior, which is designed in the example as a magnetostrictive position sensor. The position sensor 17 has a waveguide 18 in the example, which protrudes in the axial direction into a coaxial bore 19 in the piston rod 8. A permanent magnet 20 is arranged on the piston 4. The waveguide 18 protrudes through the base carrier 11 up to the evaluation unit 21, in which a transducer system (not shown) is formed for detecting and evaluating the structure-borne soundwaves in the waveguide 18.

Moreover, a pressure sensor 23 is arranged on the base carrier 11 in the interior 13. The pressure sensor 23 has a bore 24, which defines a measurement volume 25. The measurement volume 25 is terminated fluid-tight by a membrane 26 toward the interior 13. The membrane 26 is deformable in dependence on the pressure. A pressure pickup 27, which is electrically connected to the evaluation unit 21, is located on the base of the bore 24. The pressure pickup 27 can operate capacitively or resistively, for example. The advantage in this arrangement is that the pressure pickup 27 is not in contact with fluid and accordingly can be made simply and inexpensively. Simple conventional pressure sensors can also be used.

In the example, a bushing 22, via which the evaluation unit 21 can be electrically contacted, is arranged radially in the cylinder tube 2 in the unpressurized space 15.

If the cylinder tube 2 and the cylinder base 3 are formed in two parts, it is expedient if the two parts are connected to one another in the region of the unpressurized space 15, since then a pressure-tight seal is not necessary.

The embodiment shown of the pressure sensor 23 is only an example and is in no way limiting. Manifold other pressure sensors are known on the market, which can be fitted without significant adaptations into the base carrier 11.

In one advantageous embodiment, however, the membrane 26 is formed by a thinning of the base carrier 11. For this purpose, for example, a bore can be guided from the unpressurized space 15 up to the surface of the base carrier 11 located in the interior 13, until a desired membrane thickness is achieved.

Figure 3:
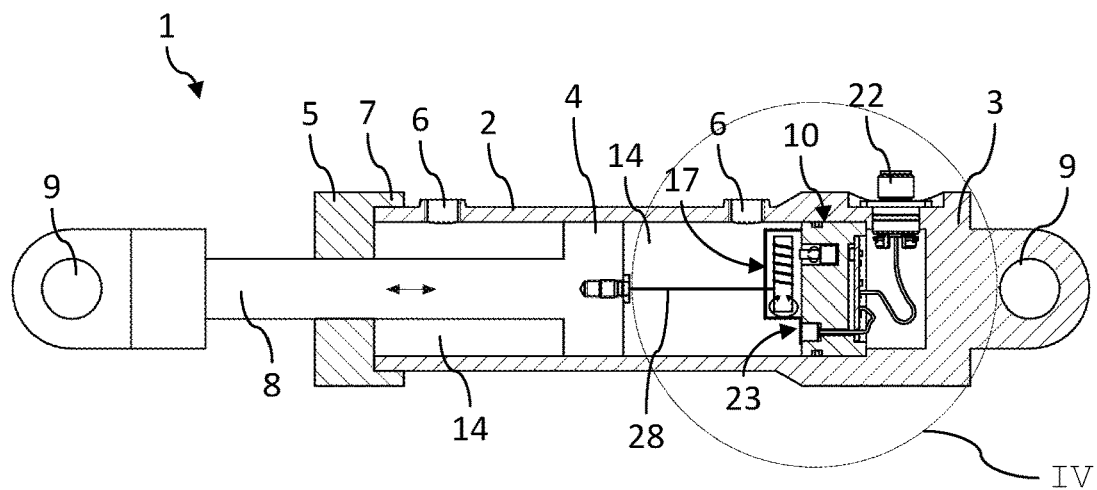
Figure 4:
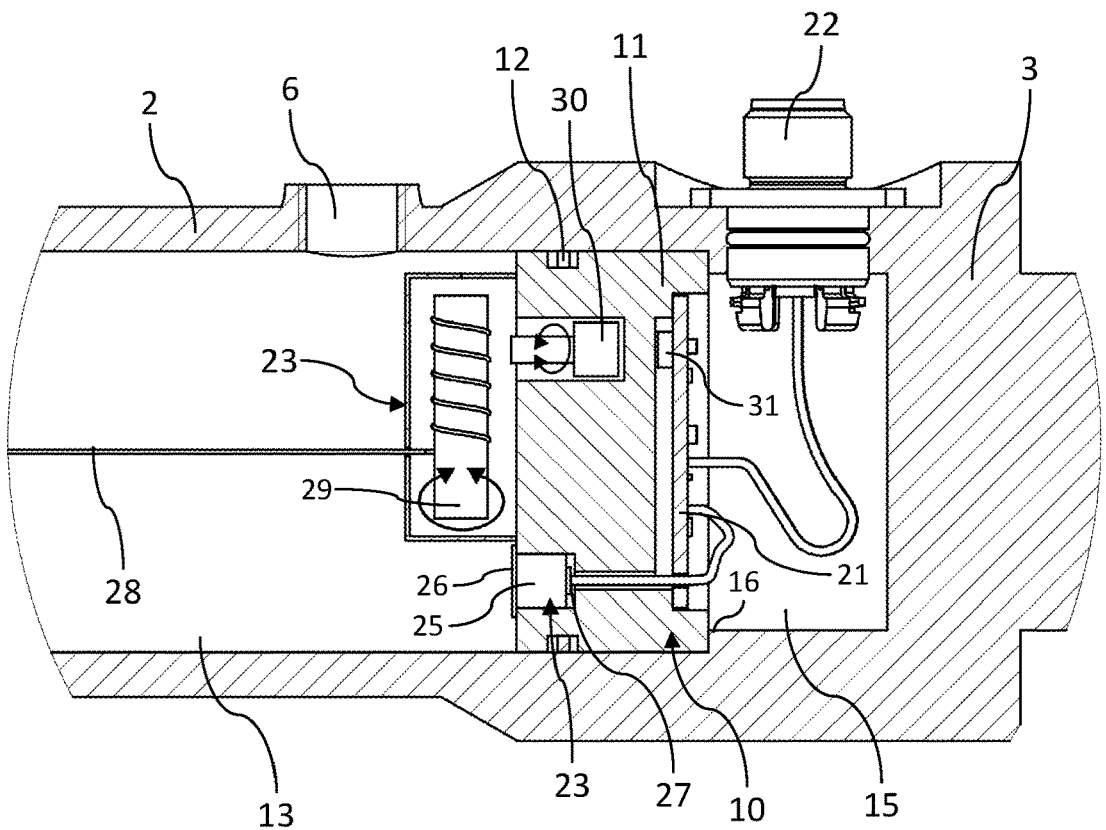
FIG. 4: shows a detail view of the sensor unit of FIG. 3, FIG. 5: shows a sectional illustration of a fluidic cylinder having an ultrasound position sensor.

FIG. 3 shows a fluidic cylinder 1, which is identical to FIG. 1 except for the position sensor 17. Therefore, only the differences from FIG. 1 are described hereinafter. The sensor unit 10 is shown in greater detail in FIG. 4.

The position sensor 17 is based here on a cable pull pickup. In the example, the position sensor 17 has a measurement cable 28, which is fastened on the piston 4, on the one hand, and can be wound on a cable drum 29, on the other hand. A rotation of the cable drum 29 is transferred in the example into a rotation of a sensor magnet 30. A position sensor 31, for example a Hall sensor, which detects a rotation of the sensor magnet 30, is arranged on the evaluation unit 21 opposite to the sensor magnet 30. The position sensor 31 can detect a position incrementally or in a coded manner.

Figure 5:
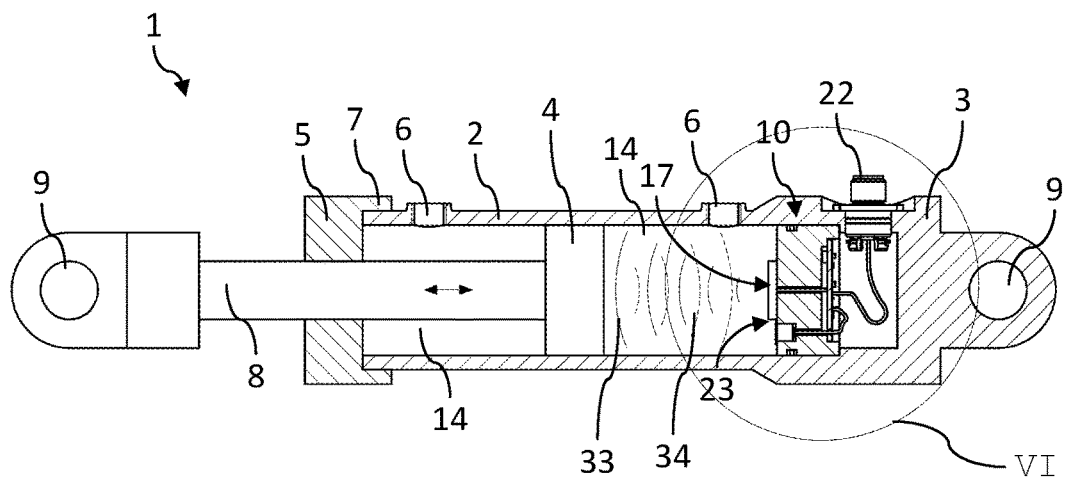
Figure 6:
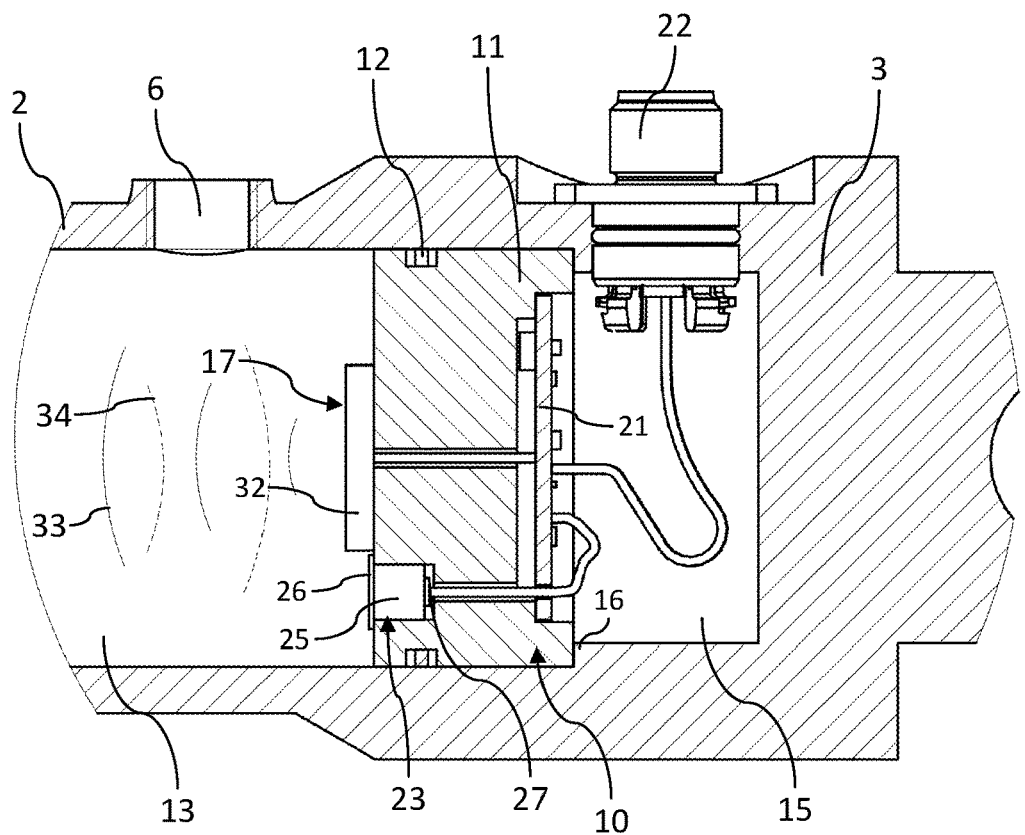
FIG. 6: shows a detail view of the sensor unit of FIG. 5.

FIG. 5 shows a fluidic cylinder 1, which is identical to FIG. 1 except for the position sensor 17. Therefore, only the differences from FIG. 1 are described hereinafter. The sensor unit 10 is shown in greater detail in FIG. 4.

The position sensor 17 is based here on ultrasound. For this purpose, the sensor unit 10 in the example has an ultrasonic transceiver unit 32, which is oriented in the axial direction. Ultrasonic waves 33 are thus emitted in the direction of the piston 4 and reflected thereon. The reflected ultrasonic waves 34 reach the transceiver unit 32 again. The position of the piston 4 can be determined from the runtime of the ultrasonic waves. The electrical connection to the evaluation unit 21 is established through the base carrier 11.

In addition to the position sensors shown here, other known position sensors, such as linear potentiometers, are also usable with the invention. The measurement principles shown can also be implemented in another manner. This also applies to the pressure sensors. The invention is therefore not restricted to one of the embodiments shown in any way.

What is claimed is:

1. A sensor unit for a fluidic cylinder having a base carrier on which a circumferential seal is formed, so that an interior of the fluidic cylinder is sealable, and having a position sensor for detecting a position of a piston, wherein the sensor unit has a pressure sensor for detecting a pressure in the interior; and
    wherein a pressure-variable region is formed on a surface of the base carrier in the interior, and in that a pickup for detecting a pressure-dependent shape change of the pressure-variable region is arranged outside the interior.

2. The sensor unit as claimed in claim 1, wherein the position sensor and the pressure sensor are arranged in the interior.

3. The sensor unit as claimed in claim 1, wherein the pressure-variable region is formed as a membrane, which is incorporated into the base carrier or is formed by thinning a wall region.

4. The sensor unit as claimed in claim 1, wherein the base carrier has means for fastening in a fluidic cylinder.

5. The sensor unit as claimed in claim 1, wherein the base carrier has an external thread, so that the base carrier can be screwed into an internal thread inside a fluidic cylinder, or in that the base carrier has a flange connection for connecting to a fluidic cylinder.

6. The sensor unit as claimed in claim 1, wherein the position sensor is designed to detect a relative movement between two components.

7. The sensor unit as claimed in claim 1, wherein the base carrier has an evaluation unit, in which the sensor values are detected, outside the interior.

8. A method for determining an operating state of a fluidic cylinder, wherein
    a position of a piston is detected by means of a position sensor, in that a pressure in an interior of the fluidic cylinder is detected by means of a pressure sensor, and in that the operating state is determined from the detected position and the detected pressure; and wherein the operating state is used to determine a weight load and/or a ground support.

9. The method as claimed in claim 8, wherein an error state is recognized from the operating state, in that a position change is related to a pressure change.

10. A fluidic cylinder having a piston movable by fluid and having a position sensor for detecting a position of the piston, wherein
    the fluidic cylinder has a base carrier on which a circumferential seal is formed and a pressure sensor for detecting the pressure within the fluid; and
    wherein a pressure-variable region is formed on a surface of the base carrier in an interior of the fluidic cylinder, and a pickup for detecting a pressure-dependent shape change of the pressure-variable region is arranged outside the interior of the fluidic cylinder.

11. The fluidic cylinder as claimed in claim 10 having an evaluation unit, which is designed in particular to carry out the method as claimed in claim 8.

* * * * *